United States Patent
Duale et al.

(10) Patent No.: US 10,955,252 B2
(45) Date of Patent: Mar. 23, 2021

(54) ROAD-CONDITION BASED ROUTING SYSTEM

(71) Applicant: INTERNATIONAL BUSINESS MACHINES CORPORATION, Armonk, NY (US)

(72) Inventors: Ali Y. Duale, Poughkeepsie, NY (US); John S. Werner, Fishkill, NY (US); Arkadiy O. Tsfasman, Wappingers Falls, NY (US); Shailesh R. Gami, Poughkeepsie, NY (US); Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 423 days.

(21) Appl. No.: 15/943,791

(22) Filed: Apr. 3, 2018

(65) Prior Publication Data
US 2019/0301877 A1 Oct. 3, 2019

(51) Int. Cl.
*G01C 21/34* (2006.01)
*G01C 21/36* (2006.01)

(52) U.S. Cl.
CPC ..... *G01C 21/3461* (2013.01); *G01C 21/3484* (2013.01); *G01C 21/3492* (2013.01); *G01C 21/3691* (2013.01)

(58) Field of Classification Search
None
See application file for complete search history.

(56) References Cited

U.S. PATENT DOCUMENTS

| | | | |
|---|---|---|---|
| 5,089,963 A | 2/1992 | Takahashi | |
| 6,216,086 B1 * | 4/2001 | Seymour | G01C 21/3446 701/425 |
| 6,321,161 B1 | 11/2001 | Herbst et al. | |
| 6,405,130 B1 | 6/2002 | Piwowarski | |
| 7,512,487 B1 * | 3/2009 | Golding | G01C 21/3492 701/424 |
| 7,751,945 B2 | 7/2010 | Obata | |
| 7,881,861 B2 | 2/2011 | Kravets et al. | |

(Continued)

FOREIGN PATENT DOCUMENTS

| | | | |
|---|---|---|---|
| WO | 9002388 | 3/1990 | |
| WO | 2017100780 A1 | 6/2017 | |
| WO | WO-2017100780 A1 * | 6/2017 | G01C 21/3492 |

OTHER PUBLICATIONS

IBM "List of IBM Patents or Patent Applications Treated as Related (Appendix P)"; Filed May 3, 2018, 2 pages.

(Continued)

*Primary Examiner* — David P. Merlino
(74) *Attorney, Agent, or Firm* — Cantor Colburn LLP; Teddi Maranzano

(57) ABSTRACT

Determining a route based on road conditions includes receiving an origin and a destination from a user and calculating a plurality of routes from the origin to the destination. Aspects also include obtaining weather data along each of the plurality of routes and ranking each of the plurality of routes based on the weather data, a user profile, and on historical weather response data for areas along each of the plurality of routes. Aspects also include providing a route with a highest ranking from the plurality of routes to the user.

17 Claims, 7 Drawing Sheets

(56) References Cited

U.S. PATENT DOCUMENTS

| | | |
|---|---|---|
| 8,024,114 B2 | 9/2011 | Doyle |
| 8,185,304 B2 | 5/2012 | Insolia et al. |
| 8,412,445 B2 | 4/2013 | Uyeki |
| 8,508,353 B2 | 8/2013 | Cook et al. |
| 8,700,296 B2 | 4/2014 | Chapman et al. |
| 8,825,395 B2 | 9/2014 | Boss et al. |
| 9,002,635 B2 | 4/2015 | Trum |
| 9,254,824 B2 | 2/2016 | Ko et al. |
| 9,261,377 B2* | 2/2016 | Krzanowski ............ G01C 21/34 |
| 9,709,413 B2* | 7/2017 | Caceres ............ G08G 1/096811 |
| 9,792,575 B2 | 10/2017 | Khasis |
| 9,952,056 B2 | 4/2018 | Khasis |
| 10,262,530 B2 | 4/2019 | Bradley et al. |
| 2002/0120396 A1* | 8/2002 | Boies ................ G06Q 10/047 701/424 |
| 2006/0173618 A1 | 8/2006 | Eyer et al. |
| 2006/0265124 A1 | 11/2006 | Ohler |
| 2009/0287405 A1 | 11/2009 | Liu et al. |
| 2011/0087429 A1 | 4/2011 | Trum |
| 2011/0137551 A1* | 6/2011 | Peri ................ G01C 21/3453 701/533 |
| 2012/0078493 A1 | 3/2012 | Schunder et al. |
| 2012/0215432 A1* | 8/2012 | Uyeki ............ G01C 21/3492 701/118 |
| 2013/0304379 A1* | 11/2013 | Fulger ................ G08G 1/0967 701/533 |
| 2014/0067265 A1* | 3/2014 | Maston ............ G01C 21/3492 701/533 |
| 2014/0068777 A1 | 3/2014 | Piratla et al. |
| 2014/0163863 A1 | 6/2014 | Kirsch |
| 2015/0112919 A1 | 4/2015 | Weir et al. |
| 2015/0160025 A1 | 6/2015 | Konig |
| 2015/0168175 A1 | 6/2015 | Abramson et al. |
| 2015/0195678 A1* | 7/2015 | Fay ................ G06Q 30/0261 455/456.3 |
| 2015/0198452 A1 | 7/2015 | Gupta et al. |
| 2015/0260532 A1 | 9/2015 | Sanio et al. |
| 2015/0292893 A1 | 10/2015 | Bartsch et al. |
| 2016/0123748 A1 | 5/2016 | Chidlovskii |
| 2016/0307446 A1* | 10/2016 | Edakunni ......... G08G 1/096844 |
| 2016/0366214 A9 | 12/2016 | Munemann |
| 2017/0107919 A1 | 4/2017 | Kim |
| 2017/0323249 A1* | 11/2017 | Khasis ............... G01C 21/3469 |
| 2017/0328725 A1 | 11/2017 | Schlesinger et al. |
| 2018/0051997 A1 | 2/2018 | Grochocki, Jr. et al. |
| 2018/0058875 A1 | 3/2018 | Wan et al. |
| 2019/0017835 A1 | 1/2019 | Pickover et al. |
| 2019/0049259 A1 | 2/2019 | Galan-Oliveras et al. |
| 2019/0049262 A1* | 2/2019 | Grimm ................... G07C 5/00 |
| 2019/0113350 A1 | 4/2019 | Ngu et al. |
| 2019/0193751 A1 | 6/2019 | Fernando et al. |
| 2019/0226864 A1 | 7/2019 | Miyazaki et al. |
| 2020/0178221 A1 | 6/2020 | Byun et al. |

OTHER PUBLICATIONS

John S. Werner et al., "Local Driver Pattern Based Notifications", U.S. Appl. No. 15/969,971, filed May 3, 2018.

Ceikute, Vaida et al., "Routing Service Quality—Local Driver Behavior Versus Routing Services", 2013 IEEE 14th International Conference on Mobile Data Management, pp. 97-106.

List of IBM Patents or Patent Applications Treated as Related; (Appendix P), Date Filed Apr. 3, 2018; 2 pages.

Pantaenius Yacht Insurance "The Benefits of Weather Routing"; Dated Nov. 21, 2013; downloaded from Internet: http://pantaenius.us/en/news-events/news/newsartikel/news/the-benefits-of-weather-routing.html; Mar. 12, 2018; 2 pgs.

Werner, John S. et al. entitled "Navigational System Utilizing Local Driver Based Route Deviations" U.S. Appl. No. 15/943,789, filed Apr. 3, 2018.

Moosavi, Sobhan "Characterizing Driving Context from Driver Behavior" SIGSPATIAL'17, Nov. 7-10, 2017, 4 pgs.

Moosavi, Sobhan et al., "Trajectory Annotation by Discovering Driving Patterns", UrbanGIS'17, Nov. 7-10, 2017; 4 pgs.

Zhang, Daqing et al. "iBAT: Detecting Anomalous Taxi Trajectories from GPS Traces"; UbiComp'11, Sep. 17-21, 2011; pp. 99-108.

Ziebart, Brian D. et al., "Navigate Like a Cabbie: Probabilistic Reasoning from Observed Context-Aware Behavior"; UbiComp'08, Sep. 21-24, 2008; pp. 322-331.

\* cited by examiner

ROAD-CONDITION BASED ROUTING SYSTEM

BACKGROUND

The invention relates generally to navigation and, more specifically, to navigation based on road conditions.

Increasingly, global positioning systems (GPSs), handheld devices, and online map routing services provide mechanisms to navigate from one point to another by calculating paths based on information derived from roadway maps. These routing services typically have added features to automatically calculate the type of directions desired. For example, added features may allow an operator to specify routing objectives such as: shortest distance (using an algorithm to determine the shortest distance from one point to the next); least amount of travel time (using an algorithm to determine the shortest distance based on the road's speed limit and distance, and calculating the resulting driving time); least use of freeways; least use of energy (gasoline and/or electricity); and least use of toll roads.

Routing systems typically include cartographic maps and map databases to determine an appropriate driving route. The map databases represent a network of roads and often include information about toll roads, speed limits, highway exit points, and points of interest (POIs). The map databases also include points on a map represented in the form of latitudes and longitudes, universal transverse Mercator (UTM) coordinates, and/or geospatial coordinates. Some examples of final destinations and/or waypoints include POIs (e.g., museums, restaurants, railways, exit points, etc.), user-entered destinations, and fixed reference points along a route. A typical routing system resolves the starting point and the destination point and/or waypoints on the network and then uses an algorithm to determine a route between two points. Typical route calculations are based on finding shortest or cheapest route between two points.

SUMMARY

According to an embodiment, a navigation system is provided. The system includes a memory having computer readable computer instructions, and a processor for executing the computer readable instructions. The computer readable instructions include receiving an origin and a destination from a user and calculating a plurality of routes from the origin to the destination. The computer readable instructions also include obtaining weather data along each of the plurality of routes and ranking each of the plurality of routes based on the weather data, a user profile, and on historical weather response data for areas along each of the plurality of routes. The computer readable instructions further include providing a route with a highest ranking from the plurality of routes to the user.

According to another embodiment, a method for providing navigation based on road conditions is provided. The method includes receiving an origin and a destination from a user and calculating a plurality of routes from the origin to the destination. The method also includes obtaining weather data along each of the plurality of routes and ranking each of the plurality of routes based on the weather data, a user profile, and on historical weather response data for areas along each of the plurality of routes. The method further includes providing a route with a highest ranking from the plurality of routes to the user.

According to a further embodiment, a computer program product is provided. The computer program product includes a computer readable storage medium having program instructions embodied therewith. The program instructions are executable by a computer processor to cause the computer processor to perform a method. The method includes receiving an origin and a destination from a user and calculating a plurality of routes from the origin to the destination. The method also includes obtaining weather data along each of the plurality of routes and ranking each of the plurality of routes based on the weather data, a user profile, and on historical weather response data for areas along each of the plurality of routes. The method further includes providing a route with a highest ranking from the plurality of routes to the user.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
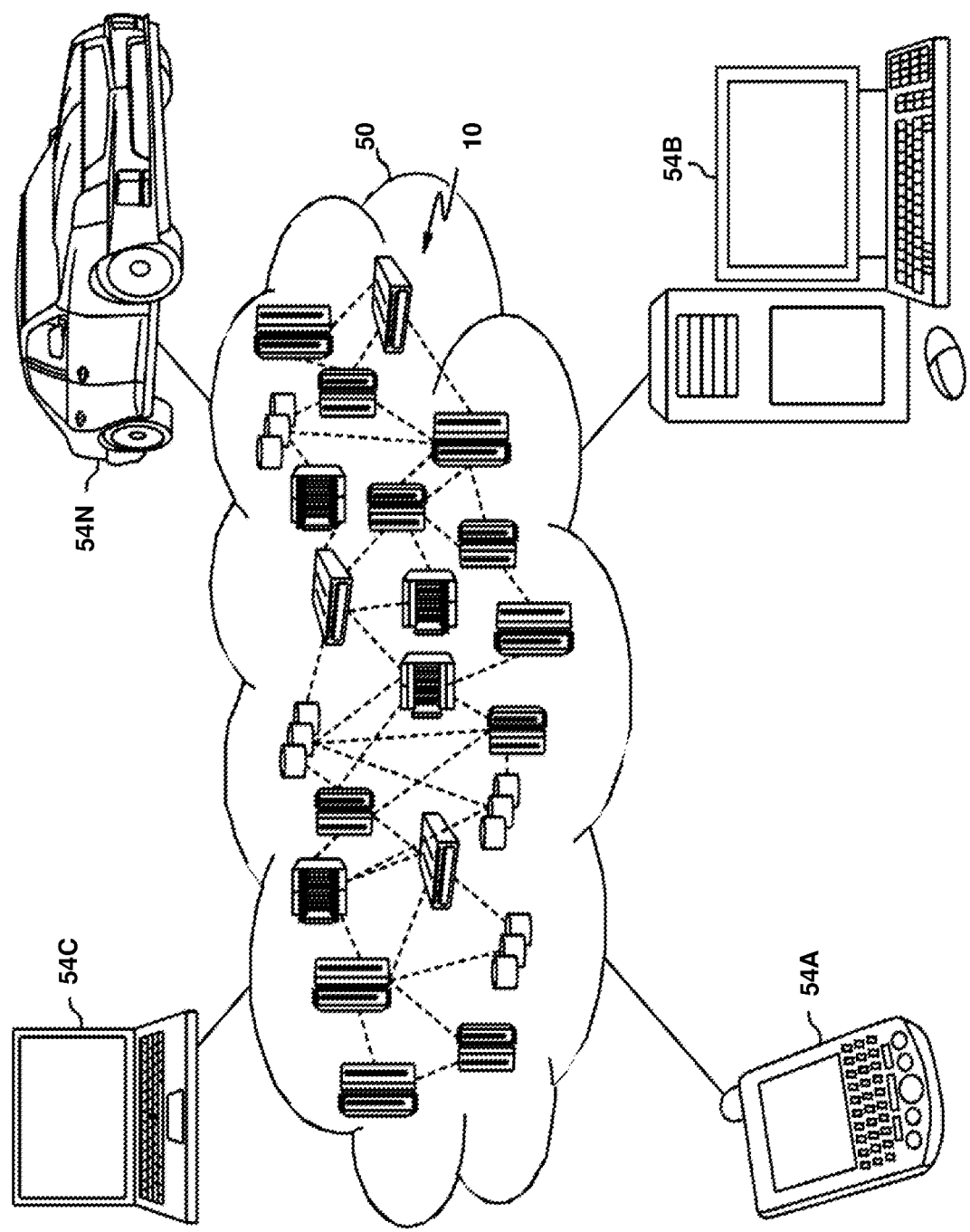
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
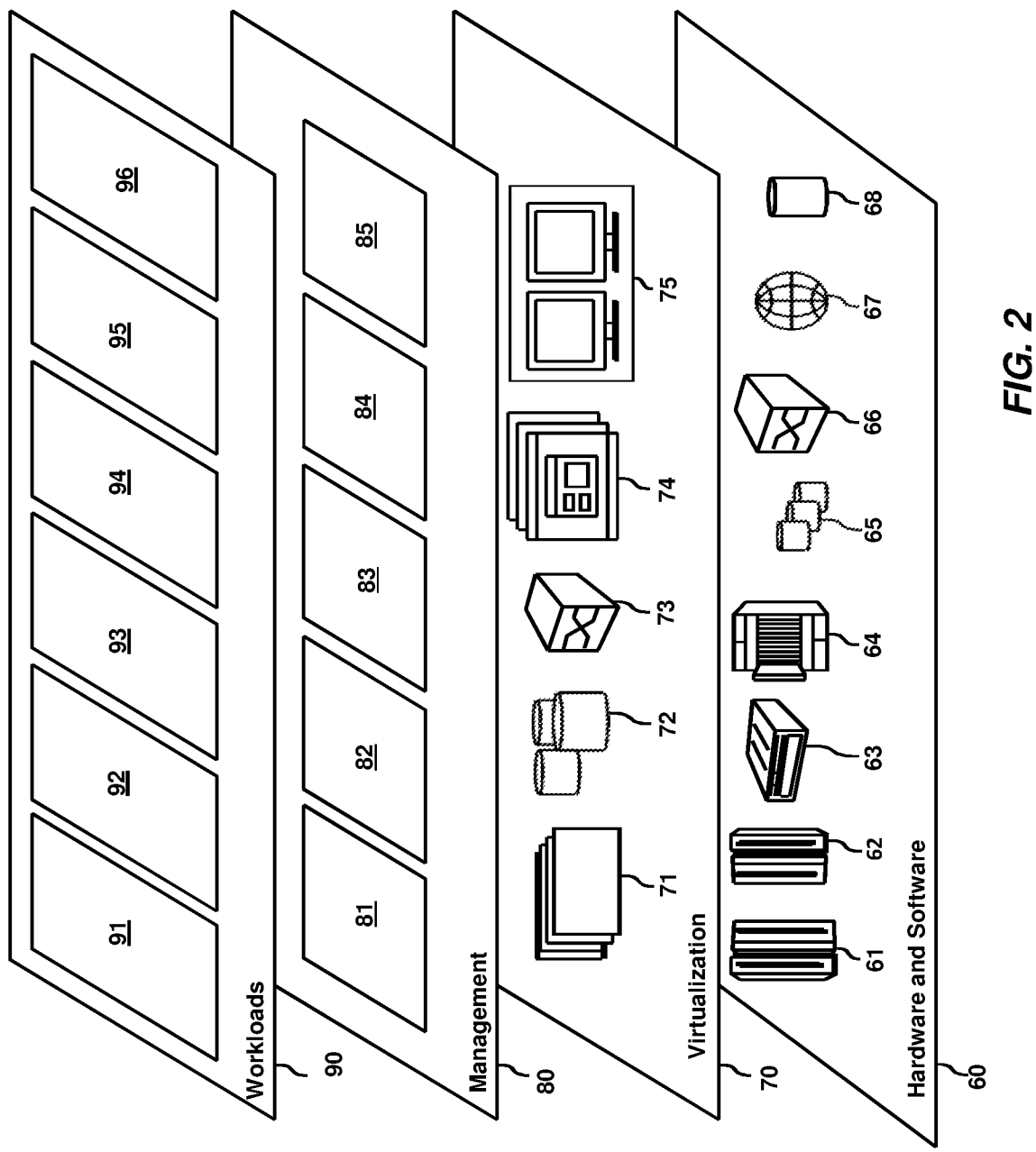
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle routing 96.

Figure 3:
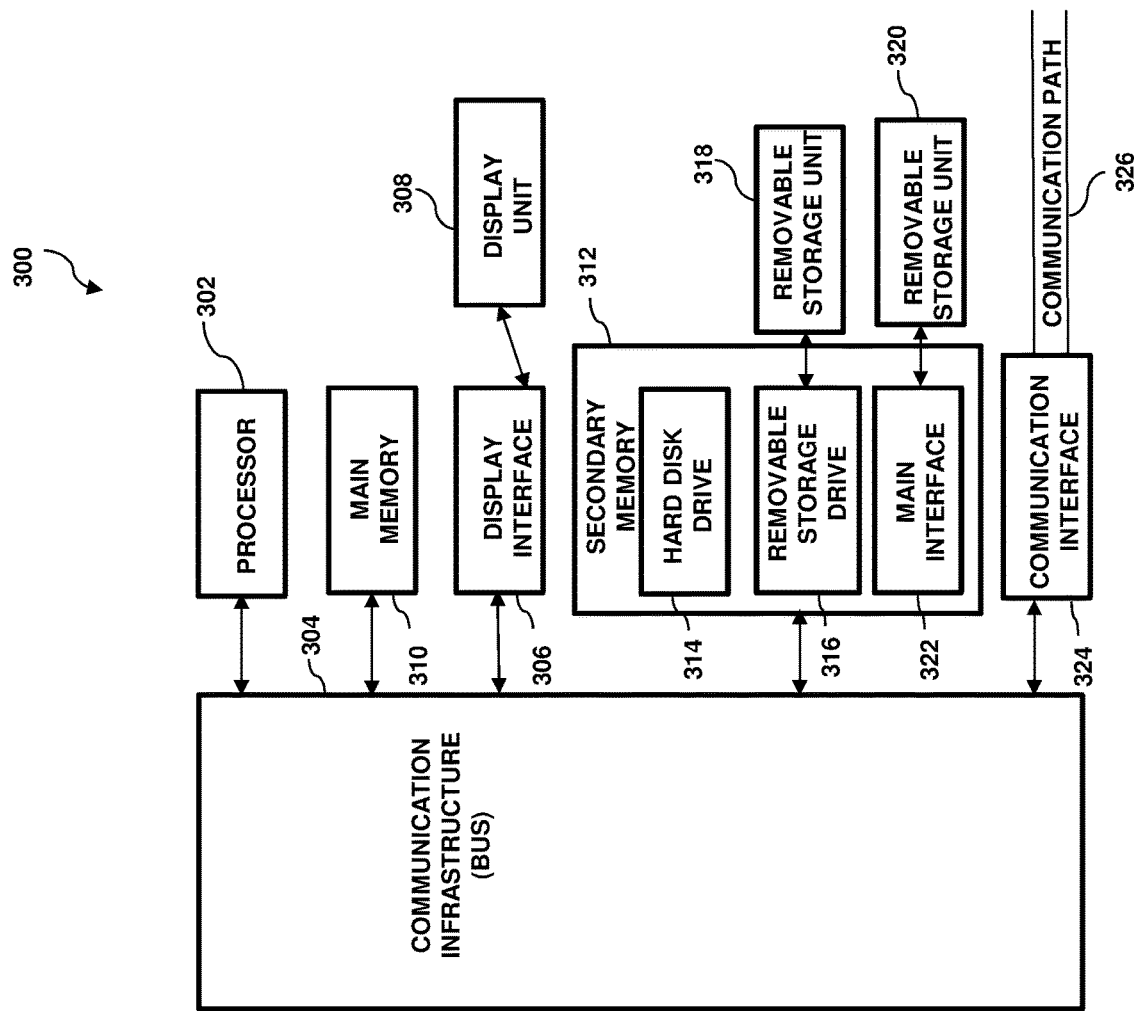
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Navigation systems offer useful directions to drivers who require assistance in locating a desired destination address in an area that is unfamiliar to them or for helping a user in selecting an optimal route to the desired destination address. As discussed above, vehicle routing systems typically allow a user to select a routing objective such as shortest distance; least amount of travel time; least use of freeways; and least use of toll roads. However, currently available routing systems do not factor expected road conditions along the various possible routes when evaluating potential routes.

In exemplary embodiments, a routing system is provided that considers possible negative effects on road conditions caused by weather events such as rain and/or snow. The routing system is configured to predict possible effects that a storm could have on certain parts of the route at the time when a user is expected to reach that point in the route and to score road safety based on the current and past storms as well as a user's personal experience on driving in similar weather conditions. In addition, the routing system is configured to provide alternative routes and/or activities specific to individual user's based on learned data from previous GPS history in order to minimize negative effects on the planned trip caused by weather related road conditions. Although there are robust weather forecast systems that show current and/or future weather conditions for multiple segments of a route, there are no current systems that add to such consideration to learn from a user's personal driving experience in making a road condition assessment to determine which roads a user can drive safely and when route alternatives or stops should be suggested.

Figure 4:
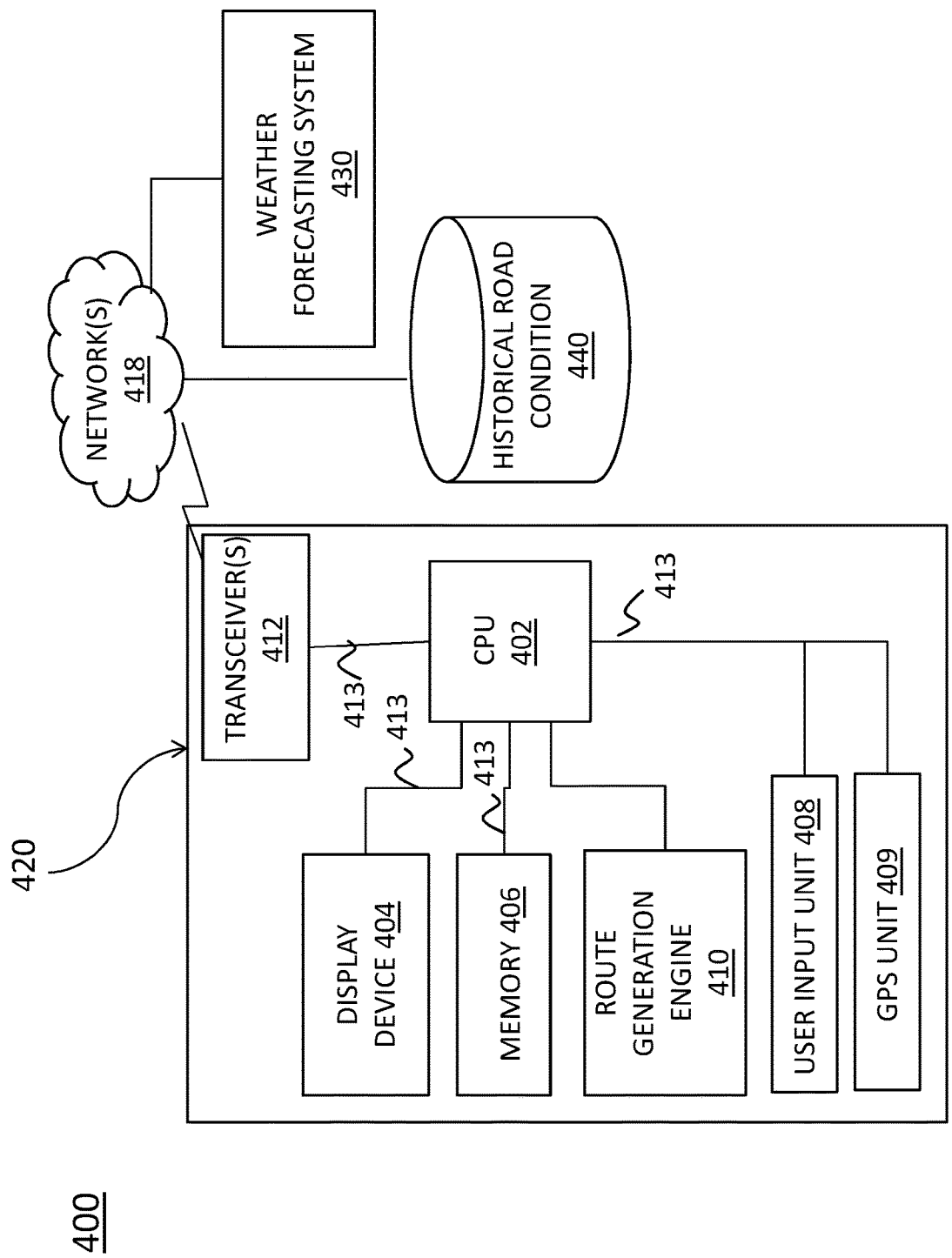
FIG. 4 depicts a system upon which vehicle routing and navigation processes may be implemented according to an embodiment of the invention.

Turning now to FIG. 4, a system 400 upon which the vehicle routing and navigation processes may be implemented will now be described in an embodiment. The system 400 shown in FIG. 4 includes components of a navigation system 420, which in turn includes a processor 402, a display device 404, a memory 406, a user input unit 408, a GPS unit 409, a route generation engine 410, and a transceiver 412. These components may be communicatively coupled via one or more communication buses 413, e.g., a data bus.

The navigation system 420 may be communicatively coupled to one or more communication networks 418 via, e.g., a wireless network interface. In an embodiment, the transceiver 412 is configured to receive signals from a global positioning system (GPS) unit 409 and to communicate with various other systems via the networks 418. The various other systems can include, but are not limited to, a weather forecasting system 430 and a historical road condition database 440.

The processor 402 is configured to receive inputs (e.g., the desired destination location) from a user via the user input unit 408 and execute the route generation engine 410 as described herein. In an embodiment, the processor 402 may be integrated into a vehicle control module such as, for example, an infotainment control module or a navigation control module.

The user input unit 408 may be implemented as a keypad or a keyboard for allowing a user to input information, such as a destination address. In an embodiment, the display device 404 may be a liquid crystal display (LCD) screen that is used to display graphics and text. The display screen 404 displays routes generated by the route generation engine 410. Although FIG. 4 illustrates the user input unit 408 and the display device 404 as separate components, it is understood that the user input unit 408 and the display device 404 may be a combined unit. For example, in an embodiment the display device 404 is a touchscreen that detects the presence and location of a user's touch.

In an embodiment, the memory 406 stores a database of maps for generating routes. The memory 406 also stores previously generated routes that have been driven by a user of the vehicle as well as previous locations that the user has visited that are recognized by overlaying GPS data onto a map when the user did not use a generated route by the navigation system to reach said locations. In a further embodiment, the memory 406 may store a profile of a user that includes an experience level that the user has in driving in various adverse road conditions, such as snow, ice, high wind, fog, or the like.

The route generation engine 410 includes a mapping tool that takes as input a starting location (e.g., address) and a destination location and returns, as output, one or more routes to follow to get from the starting location to the destination location subject to routing objectives. The route generation engine 410 accesses a database of maps (e.g., stored in the memory 406 for generating the routes). The route generation engine 410 receives weather forecast data and historical road condition data and factors the expected conditions along various routes into determining the route to be provided to the user. These features are described further herein.

The transceiver 412 may be in communication with a satellite (not shown) for providing information regarding a current (or starting) location of the vehicle. Alternatively, the current (or starting) location of the vehicle is determined by obtaining user input. Specifically, the user may input current location information into a keypad, keyboard, or touch screen of the user input unit 408. The networks 418 may be any type of known networks in the art. For example, the networks 418 may be a combination of public (e.g., Internet), private (e.g., local area network, wide area network, virtual private network), and may include wireless and wireline transmission systems (e.g., satellite, cellular network, terrestrial networks, etc.).

The weather forecasting system 430 may be any available weather forecasting system that is publically available such as the service provided by the National Weather Service or the like. In exemplary embodiments, the weather forecasting system 430 provides weather forecasts for any requested time period and any requested location. In addition, the weather forecasting system 430 stores actual recorded weather data and can provide the weather conditions for requested locations and time periods in the past.

The historical road condition database 440 is configured to store data that relates to the ability of municipalities to clear the roadways after adverse weather events. For example, in the northern part of the United States local municipalities may typically clear snowfall amounts of less than one foot within six hours, but for snowfall amounts of larger than one foot typically take one day. In another example, the historical road condition database 440 can contain information about roads that are prone to flooding, the amount of rain that typically results in flooding of each street and an amount of time until the flooding typically abates. In exemplary embodiments, the road condition database 440 stores historical weather response data that includes an average amount of time between an occurrence of an adverse weather event that results in poor road conditions and a time at which the road conditions return to normal, whether due to intervention by a municipality or due to the passage of time. As will be appreciated by those of ordinary skill in the art, the historical road condition database 440 can store various other weather related road condition data.

While the navigation system 420 is described as being integrated with a vehicle, e.g., in a vehicle control module such as, for example, an infotainment control module or a navigation control module, it will be understood that the navigation system 420 may be implemented by alternative means. For example, aspects of the navigation system 420 may be implemented on a personal digital device such as, but not limited to, a smart phone or tablet computer.

Figure 5:
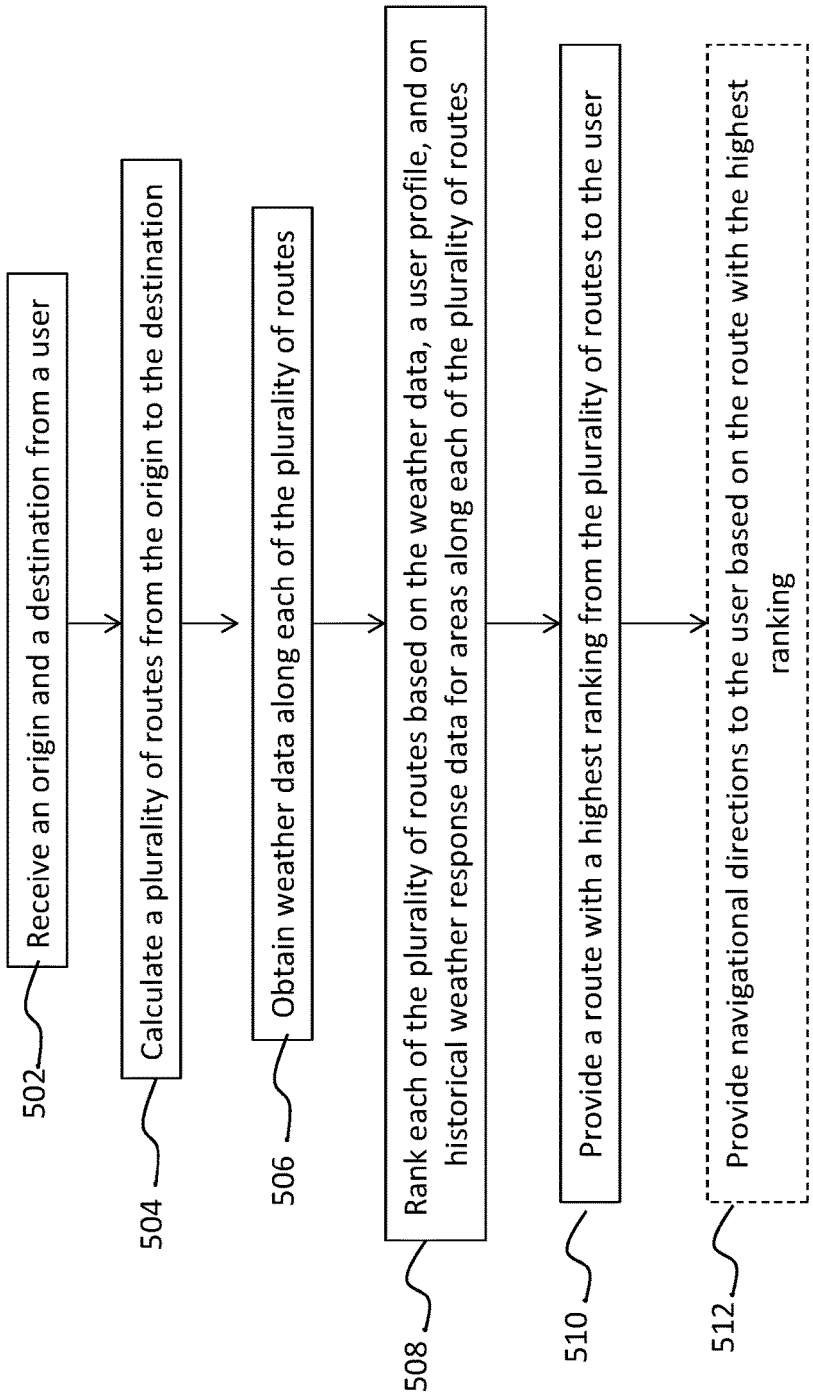
FIG. 5 depicts a flow diagram of a process for providing routing based on road conditions according to an embodiment of the invention.

Turning now to FIG. 5, a flow diagram of a process 500 for providing routing based on road conditions in accordance with an embodiment is shown. The process begins at block 502 where an origin and destination are received from a user. Next, as shown at block 504, the process 500 includes calculating a plurality of routes from the origin to the destination. Once the plurality of routes are calculated, weather data along each of the plurality of routes is obtained, as shown at block 506. In exemplary embodiments, the weather data can include weather forecast information for a time period in the future when the user will reach a particular point along the route and actual measured weather data along the routes for a predetermined amount of time. For example, the weather data may include the measured weather data along the route during the past week and the weather forecast along the routes for the next five days. The predetermined amount of time of weather data obtained may depend on the expected duration of the trip. For example, the amount of weather data obtained can be positively correlated with the expected duration of the trip (e.g., a user may need five days of weather forecasting for a trip from New York to Washington state, but may only need one day of weather forecasting for a trip from New York to Washington D.C.).

Continuing with reference to FIG. 5, as shown at block 508, the process 500 includes ranking each of the plurality of routes based on the weather data, a profile of the user, and on historical weather response data for areas along each of the plurality of routes. In exemplary embodiments, the plurality of routes are ranked such that the highest ranked route is a route with a smallest expected impact due to poor road conditions. In one embodiment, the profile of the user includes an indication of an experience level of a user in operating a vehicle in various adverse weather conditions. This may be obtained from analysis of prior driving history (not necessarily to the current destination) using weather data from their prior trips and/or vehicle diagnostic data from sensors and/or cameras (e.g., ambient temperature, speed, wheel slippage, breaking distance, etc.). For example, if a first user has multiple instances of driven during small snowstorms (e.g., less than three inches) but avoids driving in larger snowstorms for three hours in an area where it is known that local municipalities are very good at clearing roads, this information can be used to alter the ranking of a route in which the user is expected to encounter snow in the future. A second user may avoid driving in snow all together so the ranking of the same route for the second user would be lower. In exemplary embodiments, the historical weather response data for an area includes an average amount time between an occurrence of an adverse weather event that results in poor road conditions and a time at which the road conditions return to normal. Next, as shown at block 510, the route with a highest ranking from the plurality of routes is provided to the user. The route with the highest ranking may include suggesting a stop location to a user along their route if making a stop would result in the user avoiding driving in poor road conditions yet still get them to their destination quicker than going around the storm. For example, a third driver is from Buffalo, N.Y. and drives through snow frequently. If during a trip from New York to Washington State, there is a small snowstorm predicted in North Dakota in 10 hours when the user will be passing through, the navigation system may allow the user to continue driving said route. If it is known that North Dakota is bad at cleaning snow off the roads, an alternate route that is longer may be suggested that avoids North Dakota yet still takes the user through the same snowstorm in a region where the snow cleaning is better. If a fourth driver just moved to Buffalo and is originally from Florida and is making the same trip, they may not be as experienced driving in snow as the third driver. An alternate route that goes completely around the storm may add an additional two hours to the trip so a suggestion may be made to the fourth driver to stop at the mall of America in Minnesota because past history for that driver shows that they make frequent trips to their local mall and other shopping centers. Optionally, as shown at block 512, navigational directions are provided to the user based on the route with the highest ranking.

Figure 6:
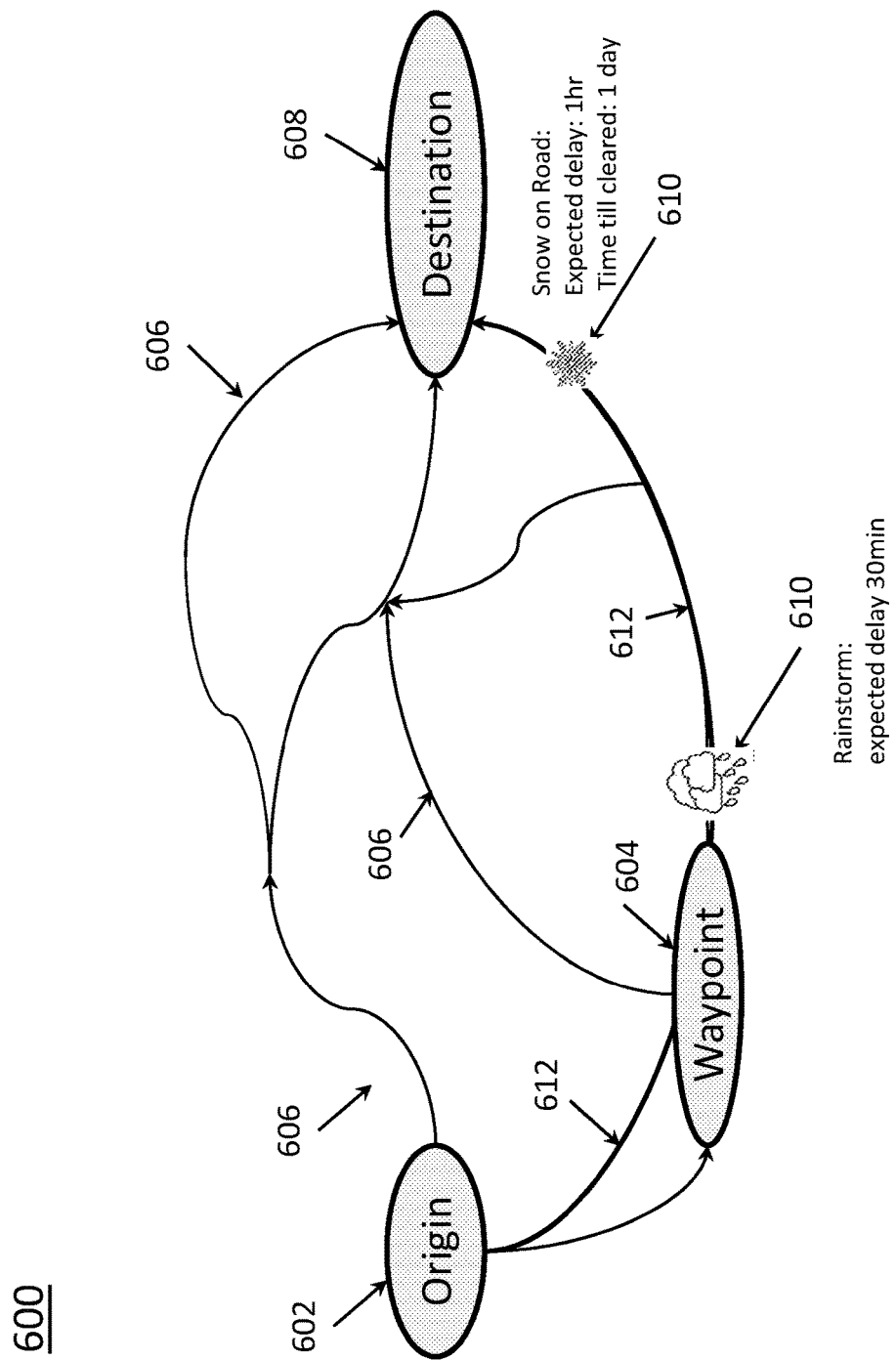
FIG. 6 depicts a map of routes generated by a routing system using road conditions according to an embodiment of the invention.

Turning now to FIG. 6, a map 600 of routes generated by a routing system using road conditions is illustrated and will now be described. In the map 600, an origin 602 and a destination 608 are shown. As illustrated, multiple routes exist between the origin 602 and the destination 608. Each route includes multiple path segments 606. As illustrated, there are a variety of potential routes that a user may take to travel between the origin 602 and the destination 608. In exemplary embodiments, the routing system obtains weather data that indicates that a weather event has made one of the path segments 606 between the origin 602 and the destination 608 impassable. As a result, the routing system will evaluate and rank alternative available routes based on weather data, a profile of the user, and on historical weather response data for areas along each of the plurality of routes. The routing system will then provide the user with the highest ranked route from the origin 602 to the destination 608. For example, the fastest route from origin 602 to destination 608 may typically be along the bottom route 612. As can be seen in FIG. 6, there are two predicted weather events 610 that a user will encounter along that route. Depending on the user, a first user may be allowed to travel this path because they have a lot of experience driving in similar conditions. A second user may be routed completely around both weather events 610 because they have no experience driving through snow and cannot afford to wait for the one day time period until all the snow is expected to be cleared. A third user may be given a suggestion to stop at waypoint 604 which is suggested specific to the third user due to their prior points of interest. The user may be suggested to stop for one hour or more to avoid the most significant portion of the weather events 610. This route with a one hour stop may be faster than an alternative route that goes around the weather events which will add 2 hours to the total trip.

Figure 7:
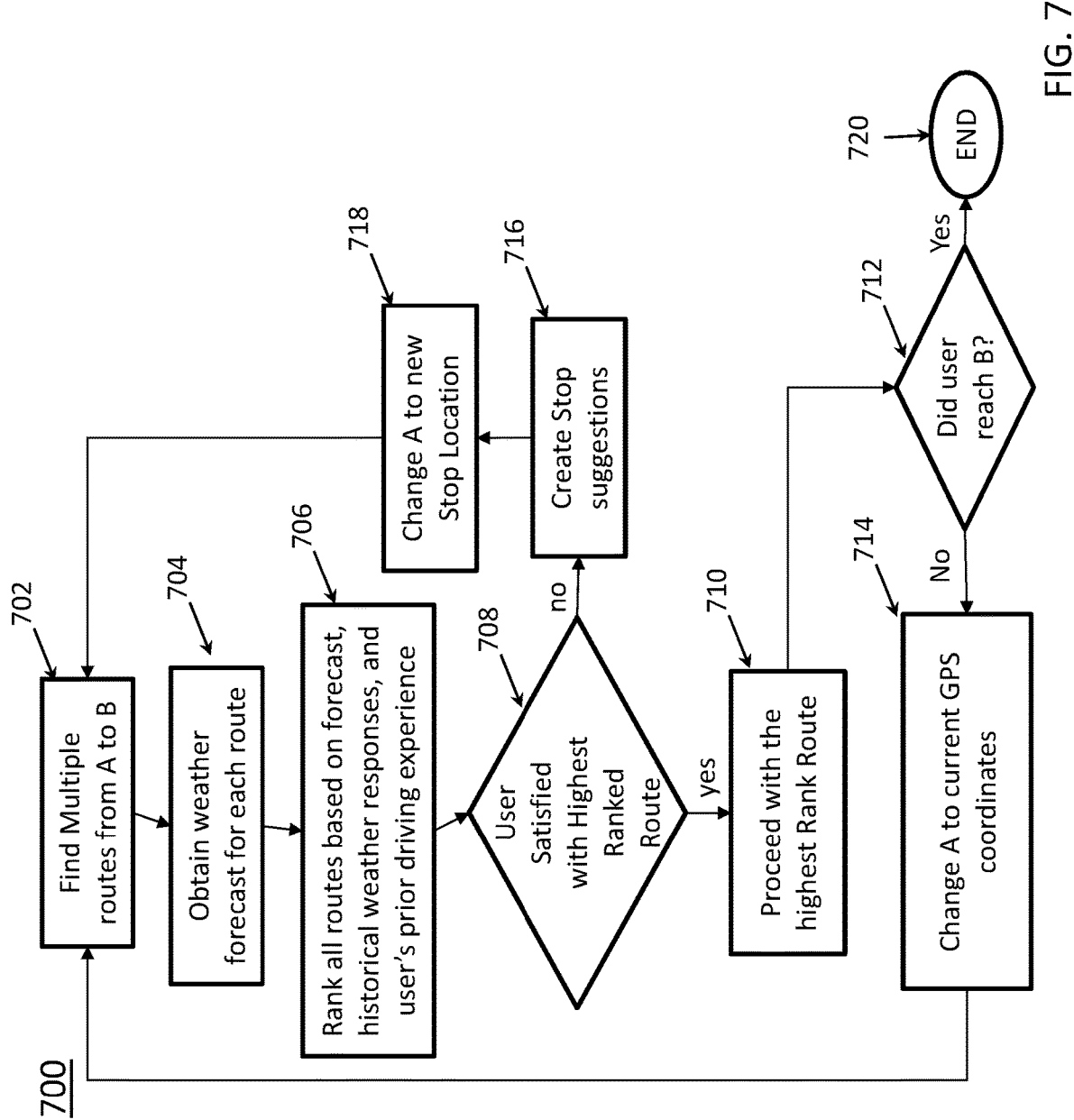
FIG. 7 depicts a flow diagram of a process for providing routing based on road conditions according to another embodiment of the invention.

Turning now to FIG. 7, a flow diagram of a process 700 for providing routing based on road conditions will now be described in an embodiment. As shown at block 702, the process 700 includes finding multiple routes from an origin (A) to a destination (B). Next, as shown at block 704, the process 700 also includes obtaining a weather forecast for each route. This weather forecast can include both future weather data and data regarding actual measured weather conditions in the past. The process 700 also includes ranking all routes based on the forecast, historical weather responses, and the user's prior driving experience at 706. The highest ranked route is then provided to the user and then, as shown at decision block 708, and the user may determine if they are satisfied with the route provided. In exemplary embodiments, the determination of whether the user is satisfied with the route provided is based on a user accepting or declining the provided route.

Continuing with reference to FIG. 7, as shown at block 710, if it is determined that the user is satisfied with the route provided, the process 700 proceeds with providing the user with the highest ranked route. In exemplary embodiments, providing the user with highest ranked route includes providing turn-by-turn navigational directions to the user as the user travels along the route. At decision block 712, it is determined if the user has reached the destination B. Based on a determination that the user has reached the destination B, the process 700 terminates at block 720. Otherwise, the process continues and updates the origin A to a current GPS location of the user, as shown at block 714 then loops back to block 702 to repeat the process to provide route alterations if weather conditions or a weather forecast changes during the trip.

As shown at block 716, based on a determination that the user is not satisfied with the highest ranked route, the process 700 includes creating stop suggestions to minimize the impact of weather related poor road conditions on the drive from the origin A to the destination B. For example, on a trip that will include an overnight stop where the location of the overnight stop is flexible the routing system can suggest a stop location that will minimize the impact of weather related poor road conditions. In another example, the process 700 may find other stops that the user may be interested in such as sight-seeing places, restaurants, theaters, games, etc. Once the user travels to the suggested stop location, the origin A is updated to the location of the stop, as shown at block 718.

In other embodiments, if the user is not satisfied with the highest ranked route, the routing system may present the user other routes along with an indication of both the location of the potential poor road conditions and the expected delay that the poor road conditions will cause. For example, the routing system may display a map 600 that includes icons 610 that are used to illustrate weather events that have an expected impact on a path segment 606. If a user selects the icon 610, additional information regarding the expected impact is displayed, the additional information includes the type of weather event and the expected delay. Optionally, the additional information may also include a time period in which the impact on the road conditions will abate. For example, if the condition is snow on the road, the time period may be the estimated time until the road will be cleared by the local municipality or until the snow will have melted.

Technical effects and benefits include modifying the operation of a route generation system to generate a route that takes into consideration the impact that weather events have on road conditions, thereby reducing the potential delays and increasing the safety of a user's journey.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A road-condition based navigation system, comprising:
a memory having computer readable instructions; and
a processor for executing the computer readable instructions, the computer readable instructions including:
receiving an origin and a destination of a trip from a user;
calculating a plurality of routes from the origin to the destination;
obtaining, simultaneously in parallel by the processor, weather data along each of the plurality of routes, wherein the weather data includes recorded weather data for a predetermined period of time before the user intends to travel and a weather forecast for a time period during which the user intends to travel and wherein a duration of the predetermined period of time is based on an expected duration of the trip;
ranking each of the plurality of routes based on the weather data, a user profile, and on historical weather response data for areas along each of the plurality of routes; and
providing a route with a highest ranking from the plurality of routes to the user.

2. The road-condition based navigation system of claim 1, wherein the computer readable instructions further include:
receiving an indication from the user that the user is satisfied with the route with the highest ranking; and
providing navigational directions to the user based on the route with the highest ranking.

3. The road-condition based navigation system of claim 1, wherein the computer readable instructions further include:
receiving an indication from the user that the user is not satisfied with the route with the highest ranking;
receiving a desired travel route from the user;
determining one or more changes in an itinerary along the desired travel route based on the weather data, the user profile, and on the historical weather response data for areas along the desired travel route,
wherein the one or more changes are determined to minimize an impact of poor road conditions.

4. The road-condition based navigation system of claim 3, wherein the one or more changes include suggesting a stop location for the user along the desired travel route to avoid poor road conditions, wherein the stop location is a location similar to locations that the user frequently visits based upon a GPS history of the user.

5. The road-condition based navigation system of claim 1, wherein the plurality of routes are ranked such that the highest ranked route is the route with a smallest expected impact due to poor road conditions.

6. The road-condition based navigation system of claim 1, wherein the user profile includes an indication of an experience level of the user in operating a vehicle in various adverse weather conditions.

7. The road-condition based navigation system of claim 6, wherein the experience level of the user is obtained by analyzing diagnostics, sensors, and/or cameras on the vehicle.

8. The road-condition based navigation system of claim 1, wherein the historical weather response data for areas along each of the plurality of routes includes an average amount of time between an occurrence of an adverse weather event that results in poor road conditions and a time at which road conditions return to normal.

9. A method for providing navigation based on road conditions, comprising:
- receiving an origin and a destination of a trip from a user;
- calculating a plurality of routes from the origin to the destination;
- obtaining, simultaneously in parallel by a processor, weather data along each of the plurality of routes, wherein the weather data includes recorded weather data for a predetermined period of time before the user intends to travel and a weather forecast for a time period during which the user intends to travel and wherein a duration of the predetermined period of time is based on an expected duration of the trip;
- ranking each of the plurality of routes based on the weather data, a user profile, and on historical weather response data for areas along each of the plurality of routes; and
- providing a route with a highest ranking from the plurality of routes to the user.

10. The method of claim 9, further comprising:
- receiving an indication from the user that the user is satisfied with the route with the highest ranking; and
- providing navigational directions to the user based on the route with the highest ranking.

11. The method of claim 9, further comprising:
- receiving an indication from the user that the user is not satisfied with the route with the highest ranking;
- receiving a desired travel route from the user;
- determining one or more changes in an itinerary along the desired travel route based on the weather data, the user profile, and on the historical weather response data for areas along the desired travel route,
- wherein the one or more changes are determined to minimize an impact of poor road conditions.

12. The method of claim 9, wherein the plurality of routes are ranked such that the highest ranked route is the route with a smallest expected impact due to poor road conditions.

13. The method of claim 9, wherein the user profile includes an indication of an experience level of the user in operating a vehicle in various adverse weather conditions.

14. The method of claim 9, wherein the historical weather response data for areas along each of the plurality of routes includes an average amount of time between an occurrence of an adverse weather event that results in poor road conditions and a time at which road conditions return to normal.

15. A computer program product comprising a computer readable storage medium having program instructions embodied therewith the program instructions executable by a computer processor to cause the computer processor to perform a method, the comprising:
- receiving an origin and a destination of a trip from a user;
- calculating a plurality of routes from the origin to the destination;
- obtaining, simultaneously in parallel by the computer processor, weather data along each of the plurality of routes, wherein the weather data includes recorded weather data for a predetermined period of time before the user intends to travel and a weather forecast for a time period during which the user intends to travel and wherein a duration of the predetermined period of time is based on an expected duration of the trip;
- ranking each of the plurality of routes based on the weather data, a user profile, and on historical weather response data for areas along each of the plurality of routes; and
- providing a route with a highest ranking from the plurality of routes to the user.

16. The computer program product of claim 15, wherein the method further includes:
- receiving an indication from the user that the user is satisfied with the route with the highest ranking; and
- providing navigational directions to the user based on the route with the highest ranking.

17. The computer program product of claim 15, wherein the method further includes:
- receiving an indication from the user that the user is not satisfied with the route with the highest ranking;
- receiving a desired travel route from the user;
- determining one or more changes in an itinerary along the desired travel route based on the weather data, the user profile, and on the historical weather response data for areas along the desired travel route,
- wherein the one or more changes are determined to minimize an impact of poor road conditions.

\* \* \* \* \*